United States Patent Office 3,813,317
Patented May 28, 1974

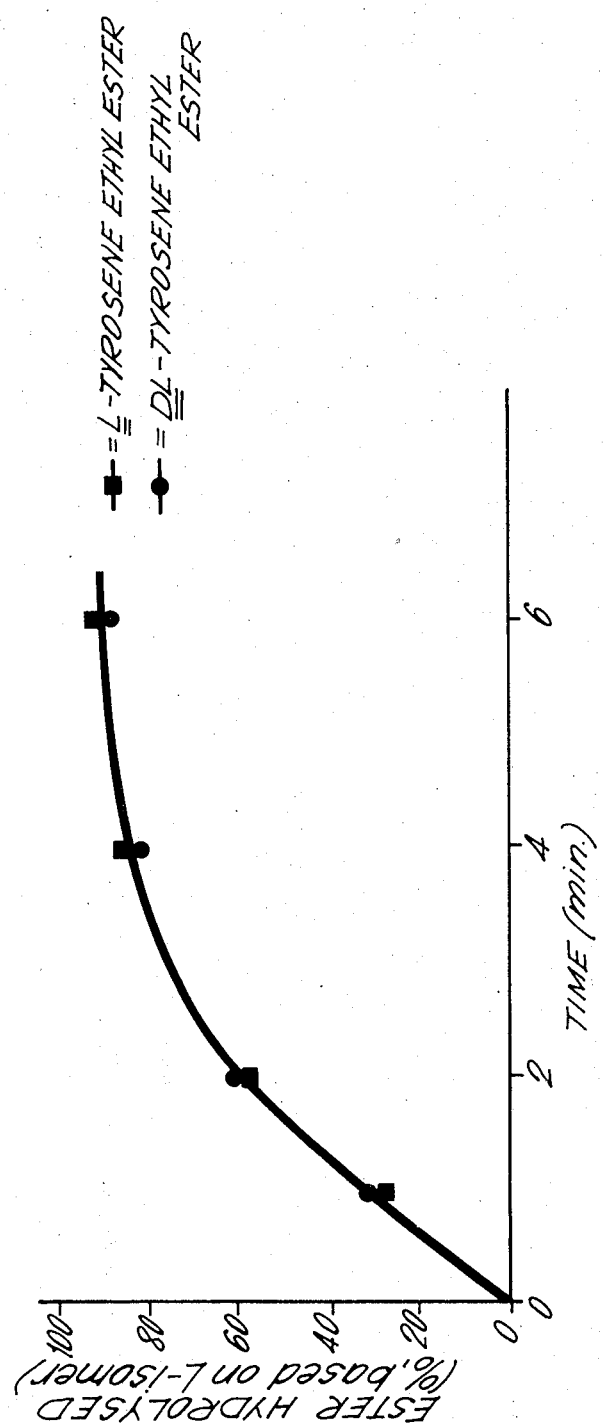

3,813,317
RESOLUTION OF RACEMATES OF RING-SUBSTITUTED PHENYLALANINES
Normand L. Benoiton, Vanier, Ontario, Jeffrey H. Y. Tong and Antoine D'Iorio, Ottawa, Ontario, and Jean C. Petitclerc, Sherbrooke, Quebec, Canada, assignors to Canadian Patents and Development Limited, Ottawa, Ontario, Canada
Filed Mar. 29, 1972, Ser. No. 239,132
Claims priority, application Canada, Apr. 2, 1971, 109,471
Int. Cl. C12d 1/00
U.S. Cl. 195—29         17 Claims

ABSTRACT OF THE DISCLOSURE

The enzymatic resolution of racemic mono- and di-ring substituted phenylalanines is provided, via the specific steps of esterification, specific enzymatic hydrolysis of the L-ester, recovery of the liberated L-acid, e.g. by crystallization, and optionally hydrolysis and recycling of the D-isomer. The process gives one economical route for the production of very pure L-DOPA and L-m-tyrosine.

BACKGROUND OF THE INVENTION

(1) Field of the invention

This invention relates to the enzymatic resolution of racemic mono- and di-ring substituted phenylalanine derivatives. In one particular embodiment, it relates to the enzymatic resolution of racemic DL 3,4-dihydroxyphenylalanine to provide L-3,4-dihydroxyphenylalanine. In another particular embodiment, it relates to the resolution of 3-hydroxy-DL-phenylalanine, to provide L-m-tyrosine.

Many phenylalanine derivatives are inherently useful as research aids. In particular, L-3,4-dihydroxyphenylalanine (L-DOPA) has been used successfully in the treatment of four pathological conditions: Parkinson's disease, Huntington chorea, Dystonia musculorum deformans, and manganese poisoning (affecting certain miners). The disease of major interest is Parkinson's disease. Furthermore, L-m-tyrosine has been shown to be converted to L-DOPA in animals, and it has the same awakening effect as L-DOPA in reserpine-treated mice. L-m-tyrosine may therefore prove useful as a drug for Parkinsonism and other similar diseases. Thus, L-m-tyrosine has been shown to be a naturally-occurring substance, i.e., it is a normal intermediate in the formation of DOPA from phenylalanine. [See J. H. Tong, A. D'Iorio, and N. C. Benoiton, Biochem. Biophys. Res. Commun. 43, 819 (1971) and 44, 229 (1971)]. Other suggestions for treating Parkinsonism using L-m-tyrosine are in German Offen. 2,100,445, P. Bamberg, and B. O. H. Sjoberg, published July 20, 1971, and P. A. E. Carlsson, H. R. Corrodi and J. O. Gardner, German Offen. 2,109,657 published Sept. 23; 1971. In addition, it has been demonstrated that, in mice, p-chlorophenylalanine markedly decreases tolerance and physical dependence development to morphine, and so provides a new tool for the study of narcotic addiction. The D-isomers of ring-substituted phenylalanines are useful in research, but are not readily accessible by other procedures.

There are many victims of Parkinsonism and patients with this disease are semi-paralyzed; they do not have control of their muscles. Treatment with L-DOPA has permitted patients to move, get up and walk, and even run. The drug, while it has been approved for treatment under physician's care, is, nevertheless, expensive. One reason for the expense of this drug lies in the difficulty of separating the D- and L-isomers. Another obstacle to its use as a drug is that many undesirable side-effects have been observed. It has been suggested that these could possibly be due to impurities in the preparations presently available.

(2) Description of the prior art

L-DOPA can be obtained by isolation from leaves of velvet beans (Guggenheim, Z. physiol. Chem., 88, 276 [1913]); from an extract of ground velvet beans (*Vicia faba*) (D. V. Wysong, U.S. Pat. No. 3,253,023, May 24, 1966); by synthesis from L-tyrosine (Waser and Lewandowski, Helv. Chim. Acta, 4, 657 [1921]); by synthesis from L-tyrosine and catechol catalyzed by β-tyrosinase from *Escherichia intermedia* (H. Kumagi, H. Matsui, H, Ohgishi, K. Ogata, H. Yamada, T. Veno, and H. Fukami, Biophys. Res. Commun., 34, 266 [1969]); by the action of microorganisms on N-substituted L-tyrosines (C. J. Sih, P. Foss, J. Rosazza and M. Lemberger, J. Am. Chem. Soc., 91 6204 [1969]); by resolution with brucine of synthetic racemic condensation products which give the isomers after hydrolysis (Harington and Randall, Biochem. J., 25, 1029 [1931]) and Vogler and Baumgartner, Helv. Chim. Acta, 35, 1776 [1952]); by resolution of N-acetyl-(3,4-dimethoxyphenyl)-DL-alanine, via an optically active organic base (e.g. ephedrine) (H. Nakamoto, M. Aburatani and M. Inagaki, J. Med. Chem., 14, 1021 [1971]); E. Berenyi, Z. Budai, L. Pallos, L. Magdanyi and P. Benko, Germ. Offen. 2,052,995 published May 6, 1971 and Germ. Offen. 2,052,953 published May 6, 1971); by fractional crystallization from ethanol-water (B. Arnold, J. E. Heveran, E. A. MacMullan, and B. J. Senkowski, U.S. Pat. No. 3,592,843, July 13, 1971); by crystallization of the D-isomer of DL-DOPA ethyl ester as the salt of dibenzoyl-D-tartaric acid (G. Losse, A. Barthe, and W. Langenbeck, D.D.R. Pat. No. 31020, Aug. 8, 1964); by resolution of N-benzoyl-3-methoxyabietylamine salt with the D recycled via NaOH/Ac$_2$O (A. Kaiser, M. Scheer, W. Haeusermann, L. Marti, Germ. Offen. 1,964,420 published July 16, 1970; and by the use of enzymes, namely, the use of *Erwinia herbicola* tyrosine phenol lyase which converts a mixture of 0.7 g. pyrocatechol, 4.0 g. L-serine, NH$_4$Cl, Na$_2$SO$_3$, and EDTA in 100 ml. medium, for 48 hours at 22° C. into 3.2 g. L-DOPA, with purification through a charcoal column, phenol giving L-tyrosine (H. Enei, H. Matsui and S. Okumura, Biochem. Biophys. Res. Commun. 43, 1345 [1971], and the resolution of N-phenylacetyl-(3-methoxyphenyl)-DL-alanine via *E. coli* acylase, followed by HI/P hydrolysis at reflux (P. Bamberg, B. O. H. Sjoberg, Germ. Offen. 2,100,445 published July 20, 1971).

It has also previously been proposed to resolve amino acids by the action of an enzymatic system on racemic N-unprotected amino acid esters or other derivatives. Among the published reports are the following:

1. O. Warburg (Z. physiol. chem. 48, 205 [1906]) obtained L-leucine by the action of pancreatin on DL-leucine ethyl ester. (This procedure involved the use of a pancreas extract, a reaction at a basic pH, and was the resolution of an amino acid which is not a phenylalanine derivative.)

2. E. Abderhalden, H, Sickel and H. Veda (Fermentforschung, 7, 91 [1923]) obtained D-tyrosine (after removal of the hydrolyzed L-isomer) by the action of pancreatin on DL-tyrosine ethyl ester. (This procedure involved the use of a pancreas extract, a reaction at a basic pH, and was the resolution of a phenylalanine derivative.)

3. M. Brenner, E. Sailer and V. Kocher (Helv. Chim. Acta, 31, 1908 [1948]) obtained both L-tryptophan and D-tryptophan (purified via naphthalene sulfonates) by the action of chymotrypsin on DL-tryptophan methyl ester. (This procedure involved the use of chymotrypsin, a reaction carried out with no specific pH control and the resolution of amino acids which are not phenylalanine derivatives.)

4. M. Brenner and V. Kocher (Helv. Chim. Acta, 32, 333 [1949]) obtained optically impure D-methionine and L-methionine (purified via naphthalene sulfonates) by the action of a pancreas extract on DL-methionine isopropyl ester obtained by distillation. (This procedure involved the use of a pancreas extract, a reaction at a basic pH, and was the resolution of an amino acid which is not a phenylalanine derivative.)

5. K. A. J. Wretlind (Acta Physiol. Scand., 20, 1 [1950]) treated DL-methionine isopropyl ester with pancreas extract as in the above-noted procedure of Brenner and Kocher. The L-ester was claimed to be pure by recrystallization while the D-ester was isolated by distillation. However, the optical purity is questionable, since the rotation is lower. (This procedure involved the use of a pancreas extract, a reaction at a baisc pH, and was the resolution of an amino acid which is not a phenylalanine derivative.)

6. K. A. J. Wretlind (J. Biol. Chem. 186, 221 [1951]) treated DL-phenylalanine isopropyl ester with a pancreas extract, to provide optically pure L- and D-isomers. The ethyl ester may also be used, but it is not as stable in water as the isopropyl ester. (This procedure involved the use of a pancreas extract, and a reaction at a basic pH, and was the resolution of phenylalanine derivatives.)

7. K. A. J. Wretlind (Acta. Chem. Scand. 6, 611 [1952]) obtained D-valine by the action of a pancreas extract on DL-valine isobutyl ester. The rate was so slow that a great deal of enzyme was required, and, moreover, the L-isomer cannot be obtained uncontaminated with degradation products of the extract. (This procedure involved the use of a pancreas extract, a reaction at a basic pH, and was the resolution of an amino acid which is not a phenylalanine derivative.)

It is known that the preferred substrates for chymotrypsin are the aromatic amino acids, such as, for example, phenylalanine and tyrosine. However, it was generally believed that only N-substituted derivatives would be good substrates. Thus, in *Chemistry of the Amino Acids*, Greenstein and Winitz, Wiley & Sons, 1961, p. 737, it is stated: "The application of this method as a general resolution procedure is rather limited, not only because spontaneous hydrolysis of the esters is possible under the conditions employed, but also because some of the amino acid esters tend, in the presence of chymotrypsin, to polymerize and form higher peptides." Furthermore, it has heretofore been believed that chymotrypsin was not stero-specific with respect to N-unprotected amino acid esters.

Suggestions have been made to synthesize L-DOPA. The procedure used for the preparation of D- and L-DOPA described in Biochem. J. 25, 1028 (1931) involves resolution of a precursor followed by conversion of the products both to D- and L-DOPA. The procedure described in U.S. Pat. No. 3,492,347 issued Jan. 27, 1970 to Chemerda et al. involves the preparation of α-methyl-DOPA by resolution of a halo acid precursor, followed by chemical conversion to α-methyl-DOPA.

(3) Aims of the invention

Accordingly, a need exists for the resolution of racemic mono- and di-ring substituted phenylalanines. An object, then, of one broad aspect of this invention is the provision of a process for the enzymatic resolution of mono- and di-ring substituted phenylalanines.

An object of a specific aspect of this invention is the provision of a process for the enzymatic resolution of racemic 3,4-dihydroxyphenylalanine to provide L-DOPA and a D-DOPA ester.

An object of yet another specific aspect of this invention is the provision of a process for the enzymatic resolution of racemic 3-hydroxyphenylalanine to provide L-*m*-tyrosine and a D-*m*-tyrosine ester.

SUMMARY OF THE INVENTION (1) Broad statement of the invention

By a broad aspect of this invention, a process is provided for the resolution of racemic mono- and di-ring substituted phenylalanines, where the substituents are Cl, F, OH and OCH$_3$, which process comprises: forming an ester of an alcohol containing 1 to 4 carbon atoms therein with the racemate; subjecting the racemic ester so formed to the action of a chymotrypsin, e.g., α-chymotrypsin at an acid pH either as such or attached to a solid support; and recovering the L-isomer acid in optical purity of at least 99.8% as a precipitate from the reaction mixture which is substantially free of the D-isomer ester.

(2) Variants of the invention

The racemic mono- and di-ring substituted phenylalanines resolvable according to the broad principles of the process of this invention are generally those substituted by Cl, F, OH and OCH$_3$. Typical examples include the following, namely 3,4-dihydroxyphenylalanine, 4 - chloro - phenylalanine, 4 - fluoro - phenylalanine, 4-hydroxy-phenylalanine (tyrosine), 3 - hydroxy - phenylalanine (*m*-tyrosine), 2-hydroxy-phenylalanine (o-tyrosine), 2-methoxy-phenylalanine.

The ester formed is of an aliphatic alcohol of relatively small carbon chain length. As the chain length increases, the ester becomes less water soluble and tends to be slower to be hydrolyzed by the enzyme. Examples of suitable such esters include the following, namely, the methyl, ethyl, n-propyl, isopropyl, n-butyl, sec. butyl and isobutyl esters.

DESCRIPTION OF PREFERRED EMBODIMENTS (1) General description

In one convenient procedure for preparing the esters, the alcohol is added to the racemic phenylalanine and HCl gas bubbled therethrough directly to form the ester.

During the hydrolysis by the enzyme, the L-isomer acid is released from the racemic mixture of esters. The L-isomer may be directly recovered as a precipitate, or the liquor may first be concentrated and the L-isomer then precipitated. The D-isomer is then recovered in the form of the ester. The liquor is first made basic and the ester then extracted out using any conventional organic solvent for esters. The D-isomers may be recovered by saponification of the D-esters after extraction, e.g. into ethyl acetate.

The enzyme preferably used is a chymotrypsin including α-chymotrypsin and active precursors, namely δ-chymotrypsin and γ-chymotrypsin. However, the enzyme preferred is α-chymotrypsin, E.C. 3,4,4,5. The amount of the enzyme used is variable and is not subject to any criticality. However, a lesser amount of enzyme reduces cost. Furthermore, the hydrolytic reaction proceeds with as small an amount as possible of the enzyme. Amounts successfully used have ranged from 35–120 mg. enzyme per gram of substrate. The enzyme may also be attached to any suitable solid support well known to those skilled in the art.

It is preferred, for convenience, to operate in an aqueous solution. The concentrations are not critical, but preferably a balance should be found. The more dilute the solution, the more active is the enzyme. On the other hand, the more concentrated the solution, the easier is the recovery.

With respect to temperatures, the enzyme is most active at a temperature of about 37° C. However, normal ambient room temperature (e.g., about 25° C.) is preferably used. The use of higher temperatures, while favoring the activity of the enzyme, also increases the danger of spontaneous (i.e., non-enzymatic) hydrolysis, and this type of hydrolysis is undesirable. In addition, reaction at about 37° C. introduces an operation involving temperature controls, which is an unnecessary manipulative complication.

It is essential, too, for the practice of this invention to carry out the enzymatic hydrolysis at an acidic pH. The pH should generally range from about 5 to about 7, with the preferred value being about 5 to about 6. As the pH approaches 7, the danger of non-enzymatic saponification increases.

The pH should be maintained at the desired range by means of an inorganic base, namely, a water soluble alkali metal or alkaline earth metal hydroxide, or ammonium hydroxide. Examples thereof include lithium hydroxide, sodium hydroxide, potassium hydroxide, barium hydroxide and ammonium hydroxide.

DESCRIPTION OF THE DRAWING

(1) Brief description of the drawing

In the accompanying drawing, the graph shows the ester hydrolyzed, as ordinate against time, as abscissa. A specific description appears hereinafter.

DESCRIPTION OF EXAMPLES OF THE INVENTION

(1) Specific description

The following are non-limiting Examples of aspects of this invention.

EXAMPLES 1-6

Hydrogen chloride was bubbled through a suspension of 0.5 g. of the DL-amino acid in 30 ml. of absolute ethyl alcohol for 20 min. The DL-amino acids used were as follows:

Example 1: 2-hydroxy-DL-phenylalanine
Example 2: 3-hydroxy-DL-phenylalanine
Example 3: 4-hydroxy-DL-phenylalanine
Example 4: 3,4-dihydro-DL-phenylalaine
Example 5: 4-chloro-DL-phenylalanine
Example 6: 4-fluoro-DL-phenylalanine Next day, the solvent was evaporated off, and the whole operation was repeated. Excess HCl was then removed by repeating the evaporation three times after the addition of ethanol. The residue was dissolved in 15 ml. of water, the pH of the solution was adjusted to 5.0 with 0.2 $M$ LiOH, α-chymotrypsin then was added, and the mixture incubated at room temperature for ½-1½ hour, while the pH was being kept constant by the automatic addition of 0.2 $M$ LiOH from the titrator. (The titrator was a Radiometer pH-start type ABUIa/TTT11a/PHM 28b). After the digestion, the mixture was concentrated until crystals appeared, cooled for 1 hour, filtered, and the precipitate washed with ethanol. The L-isomer so obtained was recrystallized by dissolving in water containing 2 ml. of 1 N HCl, filtering the solution through a diatomaceous earth filter aid known by the trademark of Celite, and adding 2 ml. of 1 N LiOH.

The filtrate obtained after removal of the L-isomer was brought to pH 9.0 with 0.2 $M$ LiOH and extracted with ethyl acetate (3×50 ml.) which was then dried over MgSO$_4$ and filtered into ethyl acetate containing hydrogen chloride. The solvent was removed by evaporation, the residue was dissolved in 20 ml. of 0.2 $M$ LiOH, i.e. to pH 12.0, and the solution was kept at 45° C. for 1 hour. The pH was then adjusted to 5.0 with 1 N HCl, the solution was evaporated to dryness, the residue was triturated in hot ethanol, the mixture then cooled for several hours and filtered to give the D-isomer.

Modification A.—Resolution of 3-hydroxy-DL-phenylalanine (DL-*m*-tyrosine)

The basic procedure described above was modified by carrying out the esterification step only once. After the enzymatic digestion, the mixture was evaporated to dryness and the residue was triturated with ethanol to obtain the L-isomer. The filtrate was then evaporated to dryness, the residue was dissolved in water, and the D-amino acid obtained as described above.

Modification B.—Resolution of 2-hydroxy- DL-phenylalanine (DL-*o*-tyrosine)

The basic procedure described above was carried out. After the enzymatic digestion, the mixture was treated as for Modification A. In addition, after saponification of the D-amino acid ester, the L-isomer present due to the incomplete enzymatic reaction was destroyed by digestion with L-amino acid oxidase. For this purpose, 5 ml. of 1 N HCl and 3 ml. of 10% NaH$_2$PO$_4$ were added to bring the pH to 8.0 and the mixture was incubated at 37° C. for 24 hours, with oxygen being bubbled through, in the presence of 100 mg. of *Crotalus adamanteus* L-amino acid oxidase. A cation exchange resin in the H+ form, known by the trade name of Dowex 50 (~120 ml.) was added, the suspension was stirred for 20 min., filtered, the resin was washed with water, and the amino acid then eluted from the resin with 500 ml. of 3 N NH$_4$OH. The eluate was evaporated to dryness several times after the addition of water, and the residue was collected with the help of ethanol.

Modification C.—Resolution of 3,4-dihydroxy-DL-phenylalanine (DL-DOPA)

The basic procedure described above was repeated with the following modifications: the esterification step was carried out once; sodium hydroxide was used in all cases instead of lithium hydroxide; both isomers were crystallized separately from an aqueous solution at pH 5.5; and the D-ester was hydrolyzed by refluxing in 1 N HCl for 1 hour instead of being saponified.

The results are summarized below in Table I.

TABLE I.—DATA FOR THE RESOLUTION OF RING-SUBSTITUTED DL-PHENYLALANINES

| Amino acid derivative | Incubation conditions [a] | | | L-isomer | | | D-isomer | | |
|---|---|---|---|---|---|---|---|---|---|
| | Substrate (g.) | Enzyme (mg.) | Time (min.) | Yield (percent) | $[\alpha]^{25}$ [b] | Optical purity (percent) | Yield (percent) | $[\alpha]^{25}$ [b] | Optical purity (percent) |
| 2-OH (o-tyrosine) | 2.0 | 200 | 60 | 75 | −26.8 | 100 | 50 | +25.4 | |
| 3-OH-(*m*-tyrosine) | 0.5 | 45 | 30 | 75 | −7.9 | 100 | 78 | +7.9 | >99.5 |
| 4-OH (tyrosine) | 0.5 | 20 | 30 | 80 | −10.2 | 100 | 78 | +10.0 | 99.8 |
| 3,4-diOH(DOPA) | 4.0 | 140 | 30 | 70 | {[c]−11.7, [d]−9.5} | >99.8 | 60 | {[c]−11.6, [d]+9.5} | 99.5 |
| 4-Cl(*p*-chloro) | 0.5 | 50 | 90 | 64 | −3.5 | 100 | 60 | +3.3 | 99.5 |
| 4-F(*p*-fluoro) | 0.5 | 60 | 30 | 60 | −5.6 | 100 | 60 | +5.6 | >99.5 |

[a] pH=5.0; at room temperature.
[b] c=2; N HCl.
[c] 20° C.; in the literature 11.5° ([c]=3, 4% HCl).
[d] 30° C.

As seen in the graph providing the single figure of drawing, in an exploratory experiment, the time course of the chymotrypsin catalyzed hydrolysis of L- and DL-tyrosine ethyl ester was followed. The α-chymotrypsin catalyzed hydrolysis of tyrosine ethyl ester was carried out at pH 6.3 in 0.25 M NaCl at 25° C. [E] = $10^{-5}$ M; [S] = $4 \times 10^{-3}$ M based on the L-isomer. The reactions were terminated by the addition of an equal volume of 20% sulfosalicylic acid, and the tyrosine was determined with the analyzer. It is seen that the progress of the reaction was substantially the same in the two cases, suggesting that only the L-isomer was hydrolyzed, and that this hydrolysis was not affected by the presence of the D-isomer. The reactions seem to have terminated before completion, namely after about 88% of the one isomer had been hydrolyzed. D-Tyrosine ethyl ester was not hydrolyzed under the same conditions, either in the presence or absence of enzyme.

By carrying out the basis procedure, the DL-amino acids were converted to their ethyl esters by the classical HCl/ethanol procedure. To insure completeness of the reaction, the esterification was repeated, except for m-tyrosine and DOPA for which it was found unnecessary. The esters, which were shown to contain not more than 0.1% of free amino acid, except for o-tyrosine ester which contained 0.4% of o-tyrosine, were not crystallized nor isolated, but merely freed of solvent and excess hydrogen chloride, and then dissolved in water. They were then subjected to the action of the chymotrypsin, at pH 5–6, the pH being maintained by the automatic addition of alkali using the automatic titration system described above. After alkali uptake had ceased, which was 30 min. in most cases, but longer for o-tyrosine and p-chlorophenylalanine, the L-isomers were obtained by crystallization from the concentrated aqueous digests, except for o- and m-tyrosine which are too soluble in salt solutions. The latter were obtained by precipitation with ethanol after removal of the water by evaporation. The D-amino acid esters were isolated by extraction from a basic solution into ethyl acetate, and subsequently saponified at 45° C., except for the ester of D-DOPA which was hydrolyzed in hot acid to avoid ring oxidation. The yields were generally in the range of 60–80% for the L-isomers, and about 60% for the D-isomers. The D-esters were not hydrolyzed under the specified conditions of enzymatic hydrolysis, either in the presence or the absence of enzyme.

The chemical purity of the products was established by chromatography on an amino acid analyzer. All isomers gave essentially the same ninhydrin color constants at the starting materials. Using the chromatographic method described below, which measured the relative amounts of the two isomers in which sample, all isomers except D-o-tyrosine were shown to be at least 99.5% optically pure. All the chromatographic data are recorded below in Table II.

The optical purity of the isomers was determined by chromatography of their L-alanine dipeptides formed by reaction with L-alanine N-carboxyanhydride according to a modification of the method of Manning and Moore (J. Biol. Chem., 243, 5591 [1968]) in which the dipeptides are prepared by reaction of the amino acid with an optically pure amino acid N-carboxyanhydride and subsequently determined with an amino acid analyzer.

The L-alanyl dipeptides for the determination of optical purity were prepared by a modification of the process as described by Manning and Moore. The sample (100 μmoles) was weighed into a 100 x 10 mm. test tube formed of a heat-resistant glass known by the trademark of Pyrex and 1 ml. of ice-cold 0.45 M potassium borate buffer, pH 10.4 (prepared by adding 5 N KOH to 0.45 M boric acid at 0°) (instead of sodium borate buffer to a pH of 10.2) and one drop of octanoic acid were added. The tube was taken into a cold room (4°), L-alanine N-carboxyanhydride (12.7 mg.; 100 μmoles) (instead of leucine N-carboxyanhydride) was quickly added, and the tube was shaken vigorously on a stirrer known by the trade name of "Vortex Genie" for 2 min. The solution was brought to pH 2 with 1 N HCl, diluted to 10 ml. with water, filtered (Celite) and suitable aliquots were analyzed on the analyzer. (The analyzer for the amino acids was a Beckman Model 120B amino acid analyzer).

Another modification involved leaving the reaction mixture at pH 10.8 for 30 min. at 25° C. after the coupling, in order to hydrolyze any phenolic esters.

TABLE II.—CHROMATOGRAPHIC DATA FROM BECKMAN AMINO ACID ANALYZER

| Isomer | 0.9 x 15 cm. Aminex A-5 resin, 57°, eluted with 0.20 N sodium citrate | | 0.9 x 50 cm. AA-15 resin, 57°, eluted with 0.20 N sodium citrate | |
|---|---|---|---|---|
| | pH 4.25; 68 ml./h. | | | |
| | Elution time (min.) | Constant* | Elution time (min.) | Elution time of L-Ala. X dipeptide (min.) |
| D-m-tyrosine | 23 | 19.9 | 71 | 141 |
| L-m-tyrosine | 23 | 21.0 | 71 | 154 |
| DL-m-tyrosine | 23 | 19.8 | 71 | 141,154 |
| D-tyrosine | 25 | 23.0 | 85 | 193 |
| L-tyrosine | 25 | 23.2 | 85 | 213 |
| DL-tyrosine | 25 | 22.0 | 85 | 193,213 |
| D-DOPA | 22 | 18.8 | 65 | 130 |
| L-DOPA | 22 | 18.9 | 65 | 155 |
| DL-DCPA | 22 | 18.8 | 65 | 130,155 |
| | 0.35 N, pH 6.48; 34 ml./h. | | | |
| D-o-tyrosine | 28 | 20.0 | 92 | 85 |
| L-o-tyrosine | 28 | 18.5 | 92 | 68 |
| DL-o-tyrosine | 28 | 18.8 | 92 | 85,68 |
| D-p-Cl-Phe | 54 | 20.7 | 219 | 177 |
| L-p-Cl-Phe | 54 | 21.0 | 219 | 126 |
| DL-p-Cl-Phe | 54 | 21.0 | 219 | 177,126 |
| D-p-F-Phe | 30 | 22.1 | 115 | 99 |
| L-p-F-Phe | 30 | 22.3 | 115 | 76 |
| DL-p-F-Phe | 30 | 22.8 | 115 | 99,76 |

*Peak height times width divided by concentration.

(Aminex A-5 resin is the trademark of Bio Rad Laboratories, Richmond, Calif., for its brand of sulfonic acid-type cation exchange resin. AA-15 resin is the trademark of Beckman for its brand of sulfonic acid-type cation exchange resin.)

EXAMPLE 7

DL-DOPA [(3,4-dihydroxyphenylalanine) (3.95 g.; 0.02 mole)] was suspended in absolute ethanol (240 ml.) and hydrogen chloride was bubbled through the mixture for 20 minutes. Next day, the clear solution was evaporated to dryness, and the evaporation was repeated three times after the addition of 50 ml. of ethanol each time. The residue was dissolved in water (100 ml.) and the pH was adjusted to 5.5 with sodium hydroxide. α-Chymotrypsin (140 mg.) was added and the mixture was kept at 37° C. for 30 minutes while the pH was being kept constant by the automatic addition of 1 N NaOH from the automatic titrator previously described. The mixture was concentrated to about 50 ml. and the L-DOPA which crystallized was filtered after cooling the mixture for 1 hour. Yield: 1.54 g. (78%). The product was recrystallized by dissolving in a slight excess of 1 N HCl, filtering and neutralizing to pH 5.5 with sodium hydroxide. Yield: 1.38 g. (70%).

The original mother liquor was brought to pH 9.0 with sodium hydroxide, saturated with sodium chloride, and extracted three times with 100 ml. of ethyl acetate. The extract was dried (MgSO₄) and filtered into 50 ml. ethyl acetate containing hydrogen chloride. The solvent was removed under reduced pressure, and the residue was refluxed for 1 hour in 120 ml. of 1 N hydrochloric acid. tered with the aid of ethanol. Yield: 1.18 g. (60%).

The identity and purity of the products was established the addition of 30 ml. of water each time. The residue was dissolved in water (20 ml.) adjusted to pH 5.5 with sodium hydroxide, and the crystallized D-DOPA was filtered with the aid of ethanol. Yield: 1.18 g. (60%).
as described above. The L-DOPA contained less than 0.2% of the D-isomer. The D-DOPA contained 0.5% of the L-isomer. The chromatographic data is the same as given in Table I.

The optical rotation of the products was determined with a Perkin Elmer model 141 polarimeter using a 1-dm. tube. The results were the same as given in Table I.

The preceding examples can be repeated with similar success by substituting the generically and specifically described reactants and operating conditions of this invention for those used in the preceding examples.

From the foregoing description, one skilled in the art can easily ascertain the essential characteristics of this invention and without departing from the spirit and scope thereof, can make various changes and modifications of the invention to adapt it to various usages and conditions. Consequently, such changes and modifications are properly, equitably and "intended" to be within the full range of equivalence of the following claims.

We claim:

1. A process for the resolution of racemic mono- and di-ring substituted phenylalanines in which the substituent is $OCH_3$, OH, Cl or F, said phenylalanines being free of acyl substituents on the N-atom which process comprises: esterifying the racemate with an alcohol having 1–4 carbon atoms; subjecting the racemic ester to the action of a chymotrypsin at an acid pH; and recovering the L-isomer acid in optical purity of at least 99.8% as a precipitate from the reaction mixture substantially free of the D-isomer ester.

2. The process of claim 1 wherein the chymotrypsin is α-chymotrypsin.

3. The process of claim 2 wherein the phenylalanine is selected from the group consisting of:
   2-methoxyphenylalanine
   2-hydroxyphenylalanine
   3-hydroxyphenylalanine
   4-hydroxyphenylalanine
   3,4-dihydroxyphenylalanine
   4-chlorophenylalanine and
   4-fluorophenylalanine.

4. The process of claim 3 wherein the alcohol for the esterification reaction is methyl, ethyl, n-propyl, isopropyl, n-butyl, sec. butyl or isobutyl.

5. The process of claim 3 wherein the pH is 5–7.

6. The process of claim 4 wherein the pH is 5–7.

7. The process of claim 6 wherein the pH is 5–6.

8. The process of claim 3 wherein the enzymatic hydrolysis is carried out at a pH of 5–6 at an ambient room temperature of about 25° C. for a time of about one-half to one and one-half hours.

9. The process of claim 2 wherein the phenylalanine is racemic DL-3,4-dihydroxyphenylalanine, thereby to provide L-3,4-dihydroxyphenylalanine.

10. The process of claim 2 wherein the phenylalanine is racemic DL-3-hydroxyphenylalanine, thereby to provide L-m-tyrosine.

11. The process of claim 1 including the additional steps of saponifying the filtrate after recovery of the L-isomer, and then recovering the D-isomer acid in optical purity of at least 99.5% therefrom.

12. The process of claim 9 including the additional steps of saponifying the filtrate after recovery of the L-isomer, and then recovering the D-isomer acid in optical purity of at least 99.5% therefrom.

13. The process of claim 10 including the additional steps of saponifying the filtrate after recovery of the L-isomer, and then recovering the D-isomer acid in optical purity of at least 99.5% therefrom.

14. A process for the resolution of racemic 3,4-dihydroxyphenylalanine which comprises: forming the ethyl ester thereof by reaction of the racemate with hydrogen chloride gas in ethanol; subjecting an aqueous solution of the ester to the action of α-chymotrypsin (E,C, 3,4,4,5) at a pH of about 5–6 at ambient room temperature while maintaining the pH substantially constant with NaOH until a substantial amount of the L-ester is hydrolyzed; concentrating the aqueous solution; and recovering the precipitate of L-DOPA so formed.

15. A process for the resolution of racemic- 3-hydroxyphenylalanine, which comprises: forming the ethyl ester thereof by reaction of the racemate with hydrogen chloride gas in ethanol; subjecting an aqueous solution of the ester to the action of α-chymotrypsin (E,C, 3,4,4,5) at a pH of about 5 at ambient room temperature for about one-half to one and one-half hours; maintaining the pH substantially constant with LiOH, until a substantial amount of the L-ester is hydrolyzed; evaporating to dryness; triturating the residue; and recovering the L-m-tyrosine so provided.

16. The process of claim 14 including the additional steps of: extracting the filtrate after recovery of the L-isomer, thereby to recover the D-isomer ester, saponifying the D-isomer ester so form, and then recovering the D-isomer acid in optical purity of at least 99.5% therefrom.

17. The process of claim 15 including the additional steps of: extracting the filtrate after recovery of the L-isomer, thereby to recover the D-isomer ester, saponifying the D-isomer ester so formed and then recovering the D-isomer acid in optical purity of at least 99.5% therefrom.

References Cited
UNITED STATES PATENTS 3,347,752   10/1967   Rauenbusch et al. _____ 195—29

OTHER REFERENCES

Malcolm Dixon and Edwin Webb: *Enzymes;* pp. 243–245; 1964; 2nd ed.; Academic Press.

A. LOUIS MONACELL, Primary Examiner
R. J. WARDEN, Assistant Examiner

U.S. Cl. X.R.
195—30

UNITED STATES PATENT OFFICE
CERTIFICATE OF CORRECTION

Patent No. 3,813,317      Dated May 28, 1974

Inventor(s) NORMAN L. BENOITON et al

It is certified that error appears in the above-identified patent and that said Letters Patent are hereby corrected as shown below:

Column 4, line 65: replace "in" with ---is--- .

Column 5, line 73: replace "start" with ---stat--- .

Column 8, lines 61-66: rewrite as follows:

---The mixture was evaporated to dryness three times after the addition of 30 ml of water each time. The residue was dissolved in water (20 ml), adjusted to pH 5.5 with sodium hydroxide, and the crystallized D-DOPA was filtered with the aid of ethanol. Yield: 1.18 g (60%).

The identity and purity of the products was established--- .

Signed and sealed this 4th day of February 1975.

(SEAL)
Attest:

McCOY M. GIBSON JR.
Attesting Officer

C. MARSHALL DANN
Commissioner of Patents